(12) United States Patent
Kim et al.

(10) Patent No.: US 10,692,613 B2
(45) Date of Patent: Jun. 23, 2020

(54) NUCLEAR FUEL ASSEMBLY TOP NOZZLE HAVING IN-CORE INSTRUMENT INSERTION STRUCTURE USING AN UPPER CORE PLATE HOLLOW GUIDE PIN

(71) Applicant: KEPCO NUCLEAR FUEL CO., LTD., Daejeon (KR)

(72) Inventors: Seong Soo Kim, Daejeon (KR); Jae Ik Kim, Daejeon (KR); Sang Youn Jeon, Daejeon (KR); Kyong Bo Eom, Daejeon (KR); Dong Geun Ha, Daejeon (KR); Jin Sun Kim, Daejeon (KR); Joo Young Ryu, Daejeon (KR); O Cheol Kwon, Daejeon (KR); Su Pil Ryu, Daejeon (KR); Hak In Lee, Daejeon (KR); Joo Hong Chun, Daejeon (KR); Ba Leum Kim, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 115 days.

(21) Appl. No.: 15/515,132

(22) PCT Filed: Oct. 22, 2015

(86) PCT No.: PCT/KR2015/011224
§ 371 (c)(1),
(2) Date: Mar. 28, 2017

(87) PCT Pub. No.: WO2016/093488
PCT Pub. Date: Jun. 16, 2016

(65) Prior Publication Data
US 2017/0229198 A1 Aug. 10, 2017

(30) Foreign Application Priority Data
Dec. 11, 2014 (KR) .................. 10-2014-0178532

(51) Int. Cl.
*G21C 17/108* (2006.01)
*G21C 3/33* (2006.01)
(Continued)

(52) U.S. Cl.
CPC ......... *G21C 17/108* (2013.01); *G21C 3/3315* (2013.01); *G21C 13/036* (2013.01); *G21C 17/102* (2013.01); *Y02E 30/40* (2013.01)

(58) Field of Classification Search
CPC ... G21C 17/108; G21C 17/102; G21C 3/3315
(Continued)

(56) References Cited

U.S. PATENT DOCUMENTS 4,667,547 A * 5/1987 Shallenberger ........ G21C 3/334
376/446
4,820,479 A * 4/1989 Hornak ................... G21C 3/12
376/364
(Continued)

FOREIGN PATENT DOCUMENTS

EP 0680052 A1 * 11/1995 ............... G21C 3/12
JP 05-107378 4/1993
(Continued)

*Primary Examiner* — Jack W Keith
*Assistant Examiner* — Daniel Wasil
(74) *Attorney, Agent, or Firm* — Rabin & Berdo, P.C.

(57) ABSTRACT

The present invention relates to a top nozzle and a nuclear reactor in which an in-core instrument, which is supposed to be inserted through a top head of a nuclear reactor, is inserted through a guide pin for an upper core plate. In a nuclear reactor including guide pins for aligning a top nozzle for a nuclear fuel assembly with an upper core plate of a nuclear reactor, a guide hole (210) is axially formed through the guide pins (200) and in-core instruments (10) are inserted through the guide holes (210).

3 Claims, 2 Drawing Sheets

(51) Int. Cl.
*G21C 17/10* (2006.01)
*G21C 13/036* (2006.01)

(58) Field of Classification Search
USPC .......................................... 376/364, 446, 254
See application file for complete search history.

(56) References Cited

U.S. PATENT DOCUMENTS

| | | | |
|---|---|---|---|
| 5,133,926 A | | 7/1992 | Doshi et al. |
| 5,180,549 A | | 1/1993 | Sparrow et al. |
| 5,207,980 A | * | 5/1993 | Gilmore .................. G21C 3/12 |
| | | | 376/364 |
| 5,297,176 A | | 3/1994 | Altman et al. |
| 5,305,357 A | * | 4/1994 | Ekeroth ............... G21C 17/108 |
| | | | 376/254 |
| 2006/0251205 A1 | * | 11/2006 | Balog .................. G21C 3/3315 |
| | | | 376/362 |
| 2008/0253497 A1 | * | 10/2008 | Singleton ............... G21C 13/02 |
| | | | 376/353 |
| 2014/0241486 A1 | * | 8/2014 | Dujin .................. G21C 3/3315 |
| | | | 376/441 |

FOREIGN PATENT DOCUMENTS

| | | |
|---|---|---|
| JP | 05-196767 A | 8/1993 |
| JP | 06-059088 A | 3/1994 |
| JP | 09-080188 A | 3/1997 |
| KR | 10-0984018 B1 | 9/2010 |
| KR | 10-2011-0103392 A | 9/2011 |
| KR | 10-2013-0080349 A | 7/2013 |
| WO | WO 2010/077906 A1 | 7/2010 |

\* cited by examiner

NUCLEAR FUEL ASSEMBLY TOP NOZZLE HAVING IN-CORE INSTRUMENT INSERTION STRUCTURE USING AN UPPER CORE PLATE HOLLOW GUIDE PIN

TECHNICAL FIELD

The present invention relates to a nuclear fuel assembly top nozzle having an in-core instrument that is inserted through the top head of a nuclear reactor using an upper core plate guide pin.

BACKGROUND ART

An in-core instrument (ICI) is a device for measuring the output of a nuclear reactor by measuring the density and temperature of neutron flux in a core of the nuclear reactor.

In the related art, in-core instruments were inserted into a core through the bottom of a reactor vessel, but there was a problem that the substances in the core of a reactor may leak through the hole formed through the bottom of the reactor vessel.

In order to solve this problem, all in-core instruments have been disposed close to a core through a hole at the top of a reactor vessel instead of the way of inserting them through the bottom of a reactor vessel.

The in-core instruments that are inserted through the top head of a nuclear reactor may interfere with a control rod assembly that is inserted over a fuel rod disposed at the center of the nuclear reactor.

RELATED ART DOCUMENTS

1. Korean Patent No. 10-0984018 (registered on Sep. 17, 2010)
2. Korean Patent Application Publication No. 10-2011-0103392 (published on Sep. 20, 2011)

DISCLOSURE

Technical Problem

An object of the present invention is to provide a top nozzle having a structure that can guide an in-core instrument, which is supposed to be inserted through a top head of a nuclear reactor, within a predetermined path using a guide pin that aligns the top nozzle of a nuclear fuel assembly and the upper core plate of a nuclear reactor.

Technical Solution

In order to achieve the objects of the present invention, there is provided a nuclear reactor including: guide pins for aligning a top nozzle for a nuclear fuel assembly with an upper core plate of the nuclear reactor, in which guide holes are axially formed through the guide pins and in-core instruments are inserted through the guide holes.

In the present invention, the guide pins may be inserted in aligning holes formed at corners of the top nozzle.

Further, a guide pin for aligning a top nozzle for a nuclear assembly with an upper core plate of a nuclear reactor according to the present invention each have a guide hole axially formed therein for insertion of an in-core instrument.

Advantageous Effects

According to a nuclear reactor of the present invention, a guide hole is axially formed through guide pins for aligning a top nozzle for a nuclear fuel assembly with an upper core plate of the nuclear reactor and in-core instruments are inserted through the guide holes.

BEST MODE

Specific structures and functions stated in the following embodiments of the present invention are exemplified to illustrate embodiments according to the spirit of the present invention and the embodiments according to the spirit of the present invention can be achieved in various ways. Further, the present invention should not be construed as being limited to the following embodiments and should be construed as including all changes, equivalents, and replacements included in the spirit and scope of the present invention.

Further, in the specification, terms including "first" and/or "second" may be used to describe various components, but the components are not limited to the terms. The terms are used to distinguish one component from another component, and for instance, a first component may be referred to as a second component, and similarly, a second component may be referred to as a first component without departing from the scope according to the spirit of the present invention.

It should be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "contact directly with" another element, it may be connected to or coupled to another element without the other element intervening therebetween. Expressions for describing relationships between components, that is, "between", "directly between", "adjacent to", and "directly adjacent to" should be construed in the same way.

Hereinafter, embodiments of the present invention will be described hereafter in detail with reference to the accompanying drawings.

Figure 1:
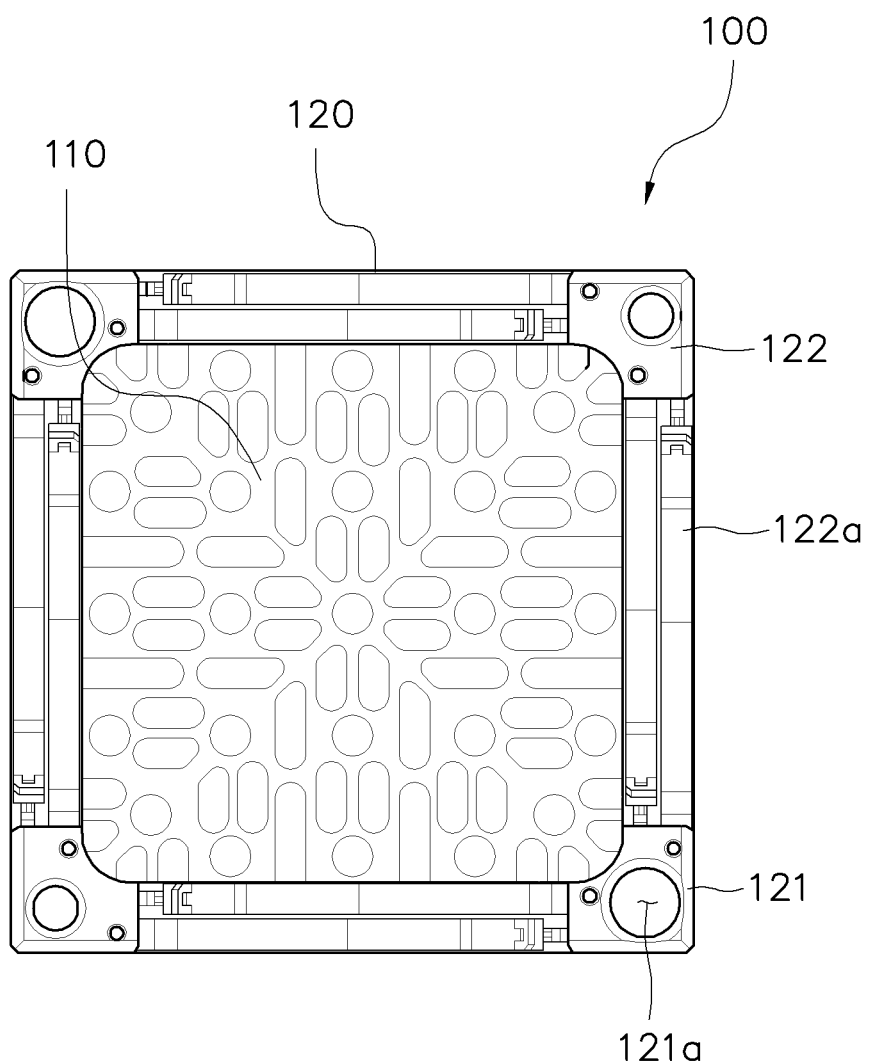
FIG. 1 is a plan view of a top nozzle of a nuclear fuel assembly.
Figure 2:
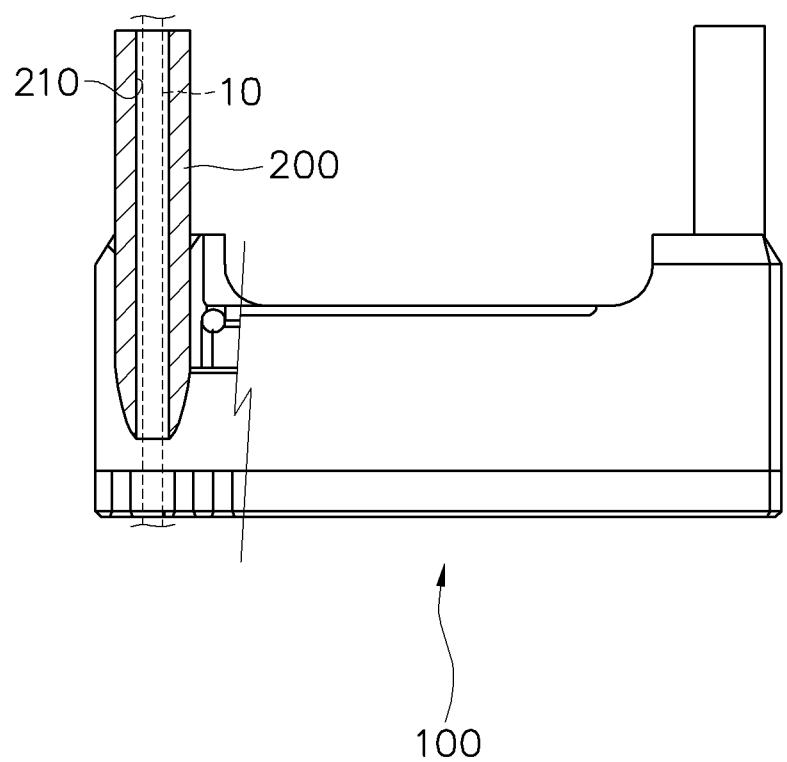
FIG. 2 is a partial cross-sectional side view of the top nozzle equipped with guide pins that align an upper core plate for guiding an in-core instrument according to the present invention.

Referring to FIGS. 1 and 2, a top nozzle 100 includes a rectangular fastening plate 110 to which a guide tube is fixed at the bottom and an enclosure 120 that protrudes upward along the edge of the fastening plate 110. Slabs 121 and 122 are disposed at the corners of the enclosure 120, in which two slabs 121 orthogonally facing each other have an aligning hole 121a and the other two slabs 122 orthogonally facing each other are provided as spring clamps each fixing a pressing spring unit 211a.

In particular, guide pins 200 that are fixed in alignment with an upper core plate (not shown) of a nuclear reactor are inserted in the aligning holes 121a of the top nozzle 100, and preferably, the guide pins 200 each have a guide hole 210 axially formed to insert an in-core instrument 10.

The upper ends of the guide pins 200 are coupled to the upper core plate of a nuclear reactor directly by nuts or indirectly through couplers.

The guide pins 200 of the present invention that are coupled to the top nozzle 100 laterally fix a nuclear fuel assembly and guide an in-core instrument into instrumentation tubes of a nuclear fuel assembly.

Accordingly, in-core instruments that are supposed to be inserted downward are inserted into the guide hole 210 of the guide pins 200 and guided to the core from an upper core plate when they are inserted into instrumentation tubes of a nuclear fuel assembly through the top nozzle 100 without straying out of a predetermined path.

In particular, by using the guide pins 200 that are inserted in the aligning holes at the corners of the top nozzle 100, it is possible to insert in-core instruments without interference with a control rod assembly.

It will be apparent to those skilled in the art that the foregoing present invention is not limited by the foregoing embodiments and the accompanying drawings, and various modifications and changes may be made without departing from the scope and spirit of the invention.

<Description of the Reference Numerals in the Drawings>

| | |
|---|---|
| 10: In-core instrument | 100: Top nozzle |
| 200: Guide pin | 210: Guide hole |

What is claimed is:

1. An apparatus for a nuclear fuel assembly, comprising:
   a top nozzle; and
   guide pins for aligning the top nozzle with an upper core plate of a nuclear reactor;
      wherein each of the guide pins has a guide hole axially formed therein,
      the guide hole
         extending from an upper end of a guide pin to an end of the guide pin located within a body of the top nozzle, and
         aligning with an aligning hole that extends through the body of the top nozzle and opens at a bottom surface of the top nozzle,
         the aligning hole, when the top nozzle is aligned with the upper core plate, being offset from a control rod assembly of the apparatus.

2. The apparatus of claim 1, wherein the aligning hole is formed at a corner of the top nozzle.

3. The apparatus of claim 1, further comprising a core instrument in the guide hole, and extending from the upper end of the guide pin through the end of the guide pin located within the body of the top nozzle into the aligning hole in the body of the top nozzle.

* * * * *